US010315790B2

(12) United States Patent
Lennartsson et al.

(10) Patent No.: US 10,315,790 B2
(45) Date of Patent: Jun. 11, 2019

(54) METHOD AND APPARATUS FOR MANUFACTURING A TETRAHEDRAL PACKAGE (71) Applicant: TETRA LAVAL HOLDINGS & FINANCE S.A., Pully (CH)

(72) Inventors: Mattias Lennartsson, Lund (SE); Mårten Andersson, Malmö (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 662 days.

(21) Appl. No.: 14/780,969

(22) PCT Filed: Mar. 24, 2014

(86) PCT No.: PCT/EP2014/055820
§ 371 (c)(1),
(2) Date: Sep. 28, 2015

(87) PCT Pub. No.: WO2014/154623
PCT Pub. Date: Oct. 2, 2014

(65) Prior Publication Data
US 2016/0059973 A1    Mar. 3, 2016

(30) Foreign Application Priority Data
Mar. 28, 2013   (SE) ...................... 1350404

(51) Int. Cl.
*B65B 9/12*     (2006.01)
*B65B 9/20*     (2012.01)
(Continued)

(52) U.S. Cl.
CPC ............ *B65B 9/2056* (2013.01); *B29C 65/02* (2013.01); *B29C 66/1122* (2013.01);
(Continued)

(58) Field of Classification Search
CPC ....... B65B 9/12; B65B 9/2049; B65B 9/2056; B65B 9/213; B65B 51/30; B65B 51/303; B65B 51/306; B65D 75/50
(Continued)

(56) References Cited

U.S. PATENT DOCUMENTS 3,090,175 A * 5/1963 Berglund ............. B31D 5/0073
156/251
3,347,363 A    10/1967 Dykes et al.
(Continued)

FOREIGN PATENT DOCUMENTS

DE    10 2009 003 029 A1    1/2010
EP        0922652 A1 *    6/1999    ............. B65D 75/42
(Continued)

OTHER PUBLICATIONS

International Search Report (PCT/ISA/210) dated Jun. 17, 2014, by the European Patent Office as the International Searching Authority for International Application No. PCT/EP2014/055820.

*Primary Examiner* — Stephen F. Gerrity
(74) *Attorney, Agent, or Firm* — Buchanan Ingersoll & Rooney PC (57) ABSTRACT

A method of producing packages from a tube of packaging material for a liquid food product, comprises reforming a flat web of packaging material into a cylindrical tube, feeding the tube of packaging material in first direction, filling the tube with a liquid food product, transversally sealing the tube, at regular intervals, into separate package volumes, wherein a longitudinal axis of every second transversal seal being parallel to each other, and a longitudinal axis of each adjacent transversal seal being perpendicular to each other, and wherein a longitudinal axis of each transversal seal is angled in a range between 15-30° in relation to a plane which is orthogonal to the longitudinal axis of the tube of packaging material. Also disclosed is a packaging material (Continued)

for use in the method, a package produced with the method, and a filling machine performing the method.

8 Claims, 6 Drawing Sheets

(51) Int. Cl.
    *B29C 65/00*     (2006.01)
    *B29C 65/02*     (2006.01)
    *B29C 65/10*     (2006.01)
    *B29C 65/36*     (2006.01)
    *B65B 51/30*     (2006.01)
    *B65B 9/213*     (2012.01)
    *B65D 75/50*     (2006.01)

(52) U.S. Cl.
    CPC .......... *B29C 66/43129* (2013.01); *B65B 9/12* (2013.01); *B65B 9/213* (2013.01); *B65B 51/30* (2013.01); *B65B 51/303* (2013.01); *B65B 51/306* (2013.01); *B65D 75/50* (2013.01); *B29C 65/10* (2013.01); *B29C 65/368* (2013.01); *B29C 65/3656* (2013.01); *B29C 66/223* (2013.01); *B29C 66/4312* (2013.01); *B29C 66/4322* (2013.01); *B29C 66/72321* (2013.01); *B29C 66/72328* (2013.01); *B29C 66/81463* (2013.01); *B29C 66/81465* (2013.01); *B29C 66/83221* (2013.01); *B29C 66/849* (2013.01)

(58) Field of Classification Search
    USPC .......... 53/451, 551, 552; 206/436; 229/116; 493/153
    See application file for complete search history.

(56) References Cited

U.S. PATENT DOCUMENTS

| | | | |
|---|---|---|---|
| 3,925,959 A | | 12/1975 | Dykes et al. |
| 3,970,240 A | * | 7/1976 | Van Leer ............... B65D 75/50 229/116 |
| 4,744,202 A | * | 5/1988 | Wylie .................... B65B 41/18 53/451 |
| 5,220,771 A | * | 6/1993 | Burns ................... B65B 9/2049 53/113 |
| 5,727,366 A | * | 3/1998 | Manly, Jr. ............ B65B 9/2056 53/451 |
| 8,608,381 B2 | * | 12/2013 | Zoss ...................... B65D 75/58 383/107 |
| 2003/0220040 A1 | | 11/2003 | Helms |
| 2005/0236464 A1 | * | 10/2005 | Cohen .................. B65D 5/4216 229/116 |
| 2009/0100803 A1 | * | 4/2009 | Rasile et al. .......... B65B 61/025 53/450 |
| 2009/0127323 A1 | | 5/2009 | Zeiler et al. |
| 2010/0132315 A1 | | 6/2010 | Gunn |

FOREIGN PATENT DOCUMENTS

| | | | | |
|---|---|---|---|---|
| EP | 1510461 A1 | * | 3/2005 | ............. B65B 51/30 |
| FR | 1300062 A | * | 7/1962 | ............. B65D 75/50 |
| GB | 2256415 A | * | 12/1992 | ........... B65B 9/2042 |
| GB | 2271753 A | * | 4/1994 | |
| JP | 05193615 A | * | 8/2003 | ............. B65D 75/50 |
| WO | WO 2009/064384 A2 | | 5/2009 | |
| WO | WO 2010/136282 A1 | | 12/2010 | |

* cited by examiner

METHOD AND APPARATUS FOR MANUFACTURING A TETRAHEDRAL PACKAGE

FIELD OF THE INVENTION

The present invention relates to a method of manufacturing a package, and in particular to a method of manufacturing a tetrahedral package from a tube of packaging material. The invention also relates to a web of packaging material for performing the manufacturing method. The invention also relates to a package being made in the manufacturing method, and a filling machine for carrying out the method.

BACKGROUND OF THE INVENTION

Packages for liquid food have been manufactured for many years. One of the first aseptic packages to be manufactured for ambient distribution and storing was the Tetra Classic® package—a tetrahedron-shaped package. This package is made by transversally sealing a tube of packaging material from different perpendicular directions, alternately. However, the tetrahedral packages are somewhat difficult to pack in a space-efficient way in a modern distribution chain, and often require specific secondary packages to be developed, being adapted to handle the specific shape. Today, packages are often shaped like rectangular cuboids and these packages are hence very space effective. However, they do not provide any package differentiation.

In U.S. Pat. No. 3,925,959, a manufacturing process for obtaining irregular tetrahedral packages is shown. These packages are made in two mirrored versions, and six such packages can be combined for creating a cube. However, this manufacturing method requires making first one version of the package, and resetting the machine for making the mirrored version of the package, or alternatively using two different machines. This is either time-consuming or costly, and in any case cumbersome.

SUMMARY OF THE INVENTION

It is hence an object of the present invention to alleviate or mitigate at least some of the problems of the prior art, by introducing a manufacturing method, wherein the method comprises the steps of a) reforming a flat web (10) of packaging material into a cylindrical tube, b) feeding said tube of packaging material in first direction (Z), c) filling said tube with a liquid food product, d) transversally sealing said tube, at regular intervals, into separate package volumes, wherein a longitudinal axis (Y1, Y3) of every second transversal seal being parallel to each other, and a longitudinal axis (Y1, Y2) of each adjacent transversal seal being perpendicular to each other, e) and wherein a longitudinal axis (Y1, Y2, Y3) of each transversal seal is angled in a range between 15-30° in relation to a plane which is orthogonal to the longitudinal axis (Z) of the tube of packaging material. With this method, packages are formed that can be packed in a space-efficient manner.

In a further aspect of the invention, the longitudinal axis $(Y_1, Y_2, Y_3)$ of every transversal seal is angled 20-25° in relation to a plane that is orthogonal to the longitudinal axis (Z) of the tube of packaging material.

The invention also provides a web of packaging material for carrying out the method, said packaging material having a print that is specifically adapted to be manufactured according to the method.

In a further aspect of the invention, the print of the web of packaging material is so devised such that a first area (30) that will be a part of a first transversal sealing comprising a right part (30a) being angled −20 to −25° in relation to a transversal direction of the web (10) being orthogonal to the feed direction (v) of the web (10), a central part (30b) being angled 20 to 25° in relation to a transversal direction of the web, and a left part (30c) being angled −20 to −25° in relation to a transversal direction of the web, and a second area (40) that will be a part of a second transversal sealing comprising a right part (40a) being angled 20 to 25° in relation to a transversal direction of the web, a central part (40b) being angled −20 to −25° in relation to a transversal direction of the web, and a left part (40c) being angled 20 to 25° in relation to a transversal direction of the web.

In a further aspect of the invention, the web is configured such that the right part (40a) of the second area (40) extends a distance (X) further into the web than the right part (30a) of the first area (30), when measured transversally to the right edge (11) of the web, and a ratio between said distance (X) and the width (w) of the web (10) is about 0.20 to 0.22.

In a further aspect of the invention, a print of the web of packaging material is configured such that the panels that will form isosceles triangles resemble the outside of a fruit or vegetable, and the other panels resemble the inside of the same fruit or vegetable.

In a further aspect of the invention, a package is provided which is manufactured by the method of claim 1.

In a further aspect of the invention, a filling machine is provided which carries out the method.

BRIEF DESCRIPTION OF THE DRAWINGS

The description of the invention will be more easily understood when read together with the accompanying drawings, in which.

DETAILED DESCRIPTION

The present invention relates to a new method of manufacturing a tetrahedral package. A package 1 for liquid food is shown schematically in FIG. 1. This is an idealized package that has flat side panels and distinct edges, but it should be understood that an actual package deviates slightly from this ideal shape when manufactured in an actual machine. The side panels will typically be bulging outwardly slightly, and the edges will be slightly rounded.

Figure 1:
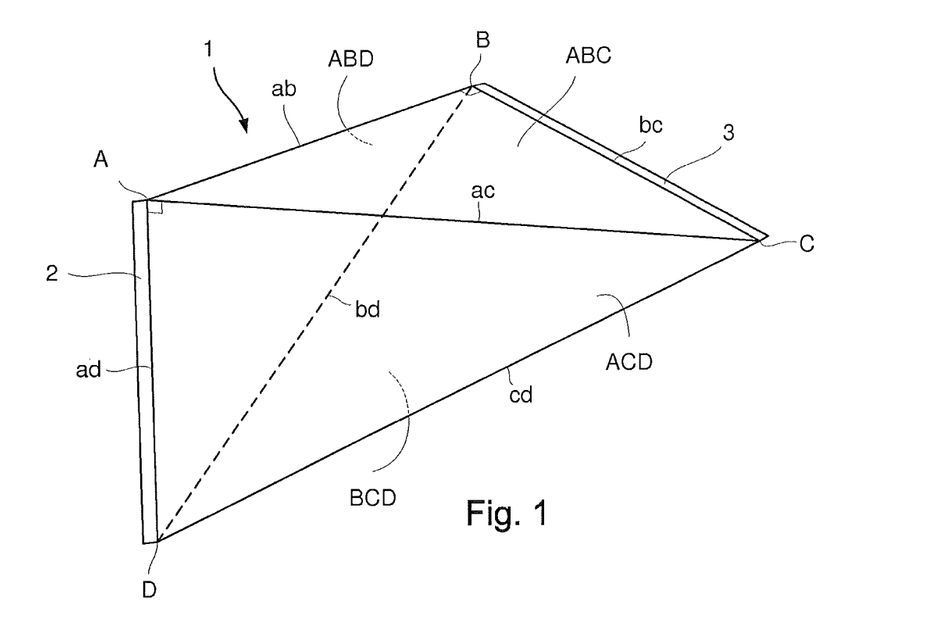
FIGS. 1-2 are perspective views of a package according to the invention.

In FIG. 1, the shown package 1 is made from a flat web of laminated carton, typically comprising an inner carton core, for giving a certain stiffness to the package, and inner and outer polymer layers. The inner polymer layer makes the package liquid-tight and protects the carton layer, and it further provides a means of heat-sealing the package into its final shape. The outer layer protects the carton from the moisture coming from the environment. In some cases, an aluminium layer can also be provided in the laminate, normally on the inside of the carton layer, to protect the food product from oxygen and/or light. The aluminium layer is typically covered with an innermost polymer layer.

The package 1 has four corners A, B, C and D that define the inner space of the package, in which the content of the package 1 will be enclosed. The package has four lateral edges, being labelled using the corners, i.e. ab, ac, bd, cd, and two end edges, ad and bc. Two end fins, 2 and 3, project from said end edges. The package 1 has four side panels, labelled by the corners that define them, i.e. ABC, ACD, ABD and BCD.

The package 1 according to the invention is shaped like an irregular tetrahedron. Each lateral panel ABC, ACD, ABD and BCD is a right-angle triangle (indicated at corners A and B in FIG. 1). Furthermore, two of the panels, ABC and ABD, are right-angled isosceles triangles having the same size, and having one edge ab in common. The other two panels, ACD and BCD, also have the same size and they share the hypotenuse, cd.

Figure 2:
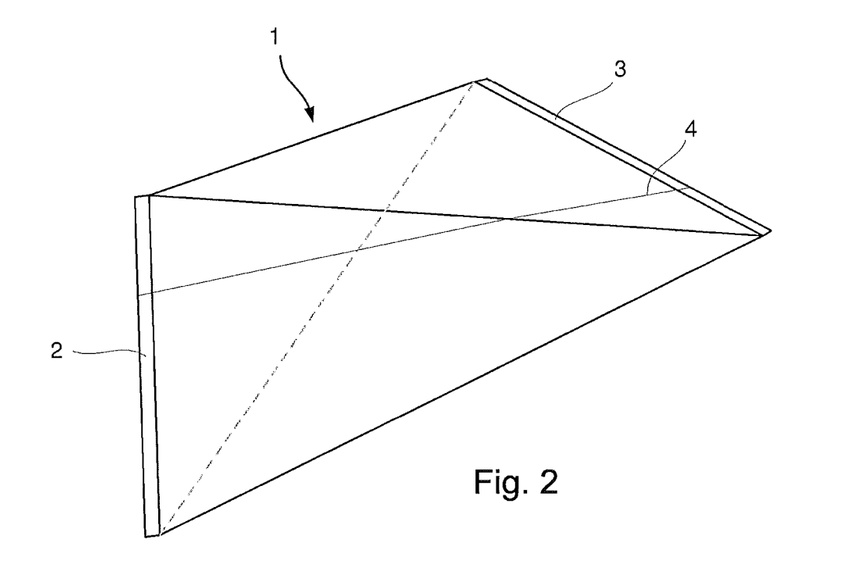

In FIG. 2, a package 1 is shown having a longitudinal sealing 4 extending from the end fin 2 to the end fin 3. The longitudinal sealing 4 is made during the forming of a flat web into a tube, before the package is filled with product and is divided into individual packages, in a way that is common in form-fill-seal machines, or in aseptic filling machines of the kind manufactured by the applicant, such as Tetra Pak® A3/Flex or Tetra Pak® A1.

Figure 3:
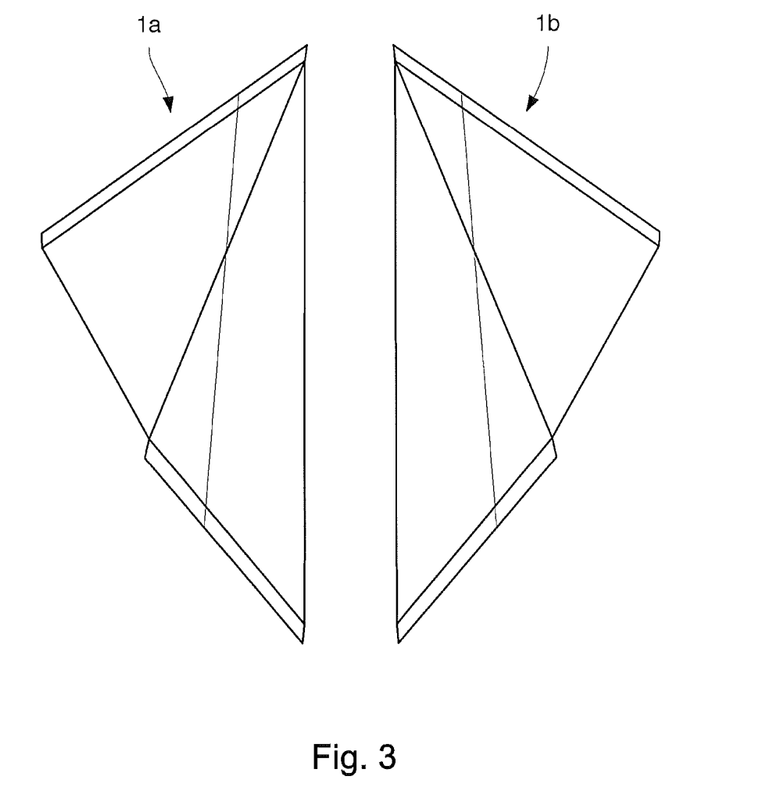
FIG. 3 is a top view of a first and second package according to the invention.
Figure 4:
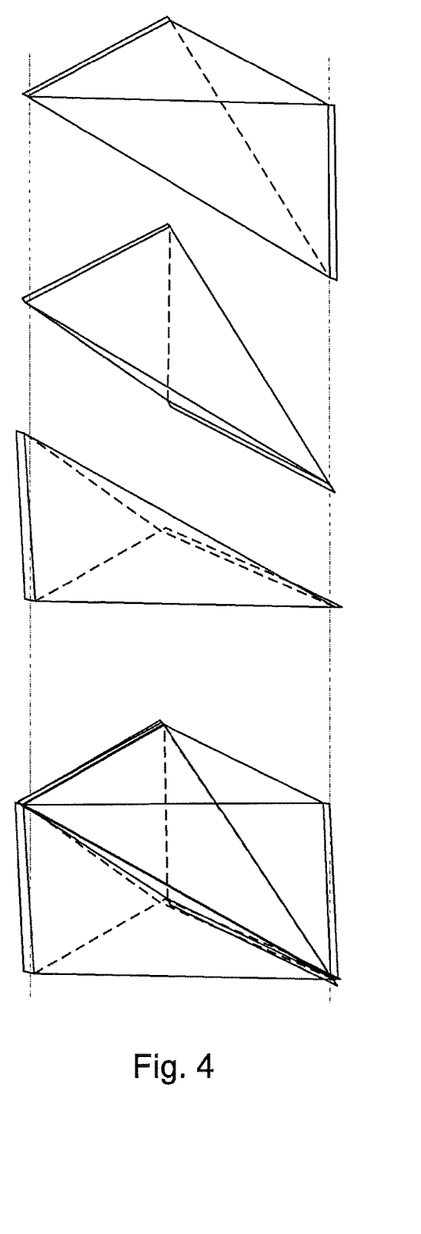
FIGS. 4-6 are exploded views of how packages can be assembled into groups.
Figure 5:
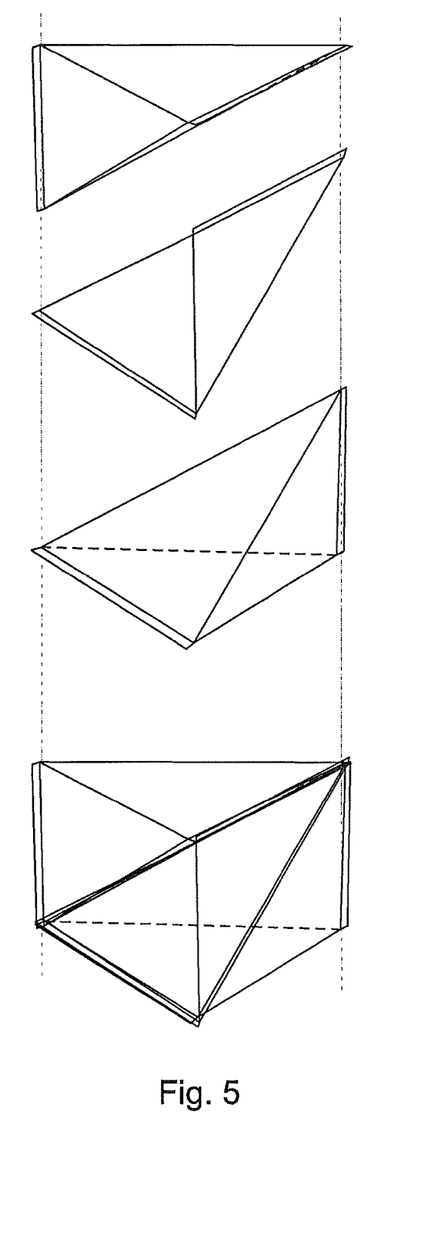
Figure 6:
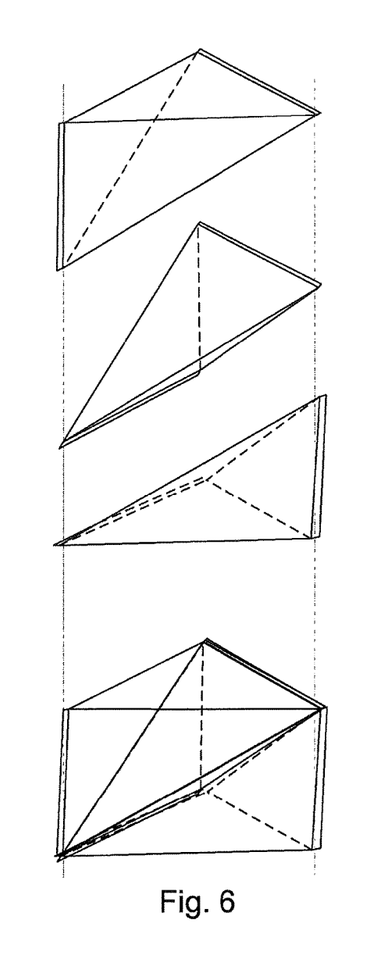

The packages 1, being defined as above, can be formed in two ways, the first being the mirror image of the second. In FIG. 3, a first package 1a is shown to the left, and a second package 1b is shown to the right, having a mirrored shape to the first package 1a. It is possible to combine three packages, two first packages 1a and one second package 1b, into a triangular prism, see FIGS. 4-6. Two such triangular prisms can be combined into a cube. A cube can be formed in two ways: 1) by combining two groups of 1a-1b-1a prisms, or 2) by combining a group of 1a-1b-1a group prism with a group of 1b-1a-1b. In the second case, the same amount of first 1a and second 1b packages are used.

Figure 11:
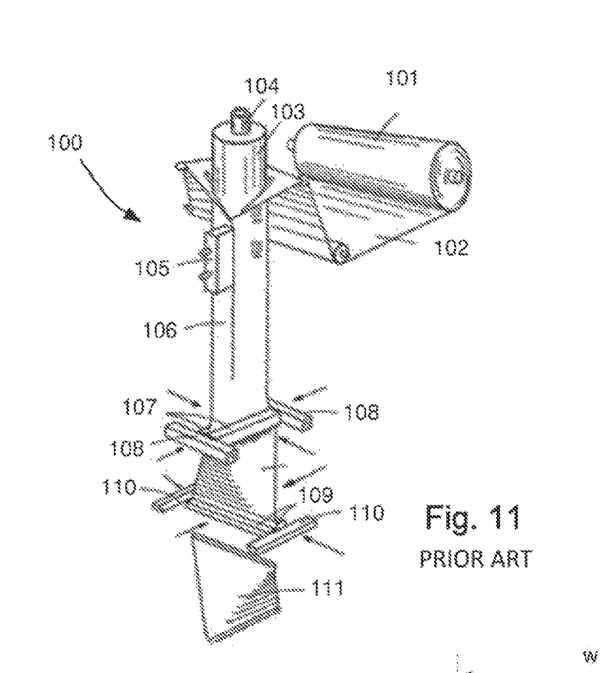
FIG. 11 is a perspective view of a manufacturing process according to the prior art.

The prior art method of manufacturing tetrahedral packages will first be described. In FIG. 11, a conceptual filling machine 100 for producing tetrahedral packages is shown. In the machine 100, a reel 101 of packaging material is provided on a bobbin, and the packaging material is led out as a continuous web 102 of flat packaging material. The packaging material is directed around a mandrel 103, through which a pipe 104 is also provided. The mandrel helps shape the web of packaging material into a tube 106 of packaging material, and the opposite edges of the web 102 of packaging material are overlapping and are sealed together by a longitudinal sealing unit 105. This is either a hot-air nozzle, which heats the opposite edges with warm sterile air, or is an inductor that heats the opposite edges of the packaging material by inducting a current in the aluminium foil, through the generation of a high-frequency magnetic field. The inside edge of packaging material is provided with a plastic strip, in order to cover the inner carton core of the packaging material. This is normally performed at an earlier stage, before the tube forming. After the longitudinal sealing, the entire inner surface is covered by polymeric material.

The now sealed tube of packaging material is filled with liquid food product coming through pipe 104. The filling level of the tube 106 can be monitored by having a floater inside tube 106, e.g. attached to the outside of the filling pipe, or it can be monitored by a free floating object whose position is detected from the outside.

The filled tube of packaging material is now transversally sealed by the sealing jaws. In FIG. 11, the upper sealing jaws 107 are brought into contact with the tube 106 of packaging material, and have hence flattened said tube. The heat generated by the heating jaws 107 (either by direct heating or by induction heating) heats up the polymeric material on the inside of the tube 106, and the pressure from the sealing jaws 107 make the inside surfaces adhere to each other. Downstream from the first sealing jaws 107, sealing jaws 109 can be seen in contact with the tube 106. As can be seen in FIG. 11, the sealing jaws 109 create a transversal sealing that is orthogonal to the transversal sealing created by sealing jaws 107. The package that is shaped between sealing jaws 107 and 109 is tetrahedral, having a top fin and a bottom fin that are orthogonal to each other. In operation, the sealing jaws 107, 109 are moved downward, feeding more packaging material to the mandrel and to the tube-forming section. The sealing jaws 107 are then replaced by sealing jaws 108, which operate in a direction that is orthogonal to the direction that the sealing jaws 107 operate. Sealing jaws 110 are also indicated at the position where the sealing jaws 109 operate, and sealing jaws 110 operate in a direction that is orthogonal to the direction that sealing jaws 108 operate. In this way, alternate transversal sealings are performed that are orthogonal to each other. The sealing jaws 107-110 are all further orthogonal to the longitudinal direction of the tube of packaging material. Today, the tube forming of the packaging material is normally performed by having several forming rings, gradually shaping the flat web into a tube by acting on the outside of the packaging material, rather than having an inner mandrel, acting on the inside of the packaging material.

Figure 7:
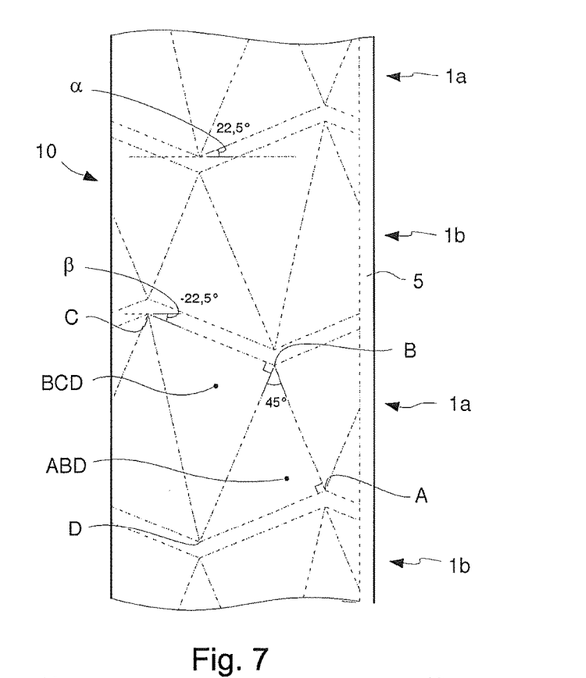
FIGS. 7-8 are plan views of a packaging material according to the invention.

Now, the method of manufacturing the packages of the invention will be described. In FIG. 7, a part of a web 10 of packaging material is given, being of the laminated type as described above. The flat web of packaging material is brought through a forming section, not shown, in which the web is formed into a cylindrical tube of packaging material. The right hand part of the web, as seen in FIG. 7, comprises an area that normally is not covered with any print. This overlap area 5 is intended to be covered by a part of the left hand side of the packaging material, during the tube forming. The overlapping edges are sealed together in a way known per se, typically by heating the edges and then pressing them together. The overlap area 5 is normally provided with a plastic strip, not shown, which is sealed to the inside surface of the overlap area 5, and which strip protrudes from the right hand edge. This strip serves to cover the inner carton edge of the packaging material, in a way known per se, which edge may otherwise absorb the liquid food product inside the package 1a, 1b.

In FIG. 7, the edges of the different side panels of the packages 1a, 1b to be produced are marked with thin phantom lines. The arrangement shown provides first packages 1a and second packages 1b alternatively from one tube of packaging material. The edges of a first package 1a and its corners are labelled in more detail. The sealing jaws of a packaging machine will be operated at an angle, indicated by the $\alpha$ and $\beta$ angles, being about 22.5° in relation to a line being perpendicular to the longitudinal axis of the tube of packaging material. The phantom lines for the first package 1a are repeated for the second package 1b, but the lines are now mirrored along the longitudinal axis. This can be seen in more detail in FIG. 8, where the areas that will form parts of the transversal sealing zones are marked as hashed areas.

Figure 8:
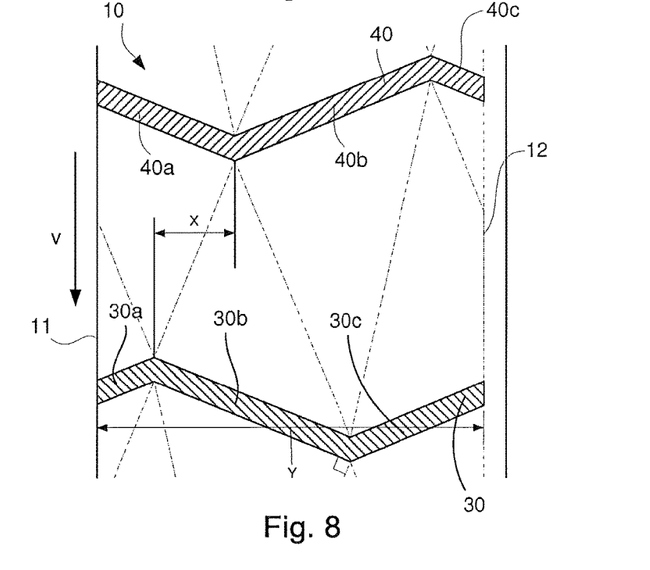

In FIG. 8, the two consecutive areas 30, 40 that will form the transversal sealing zones are indicated as hashed areas. This pattern will then be repeated throughout the web 10 of packaging material. In FIG. 8, the feed direction of the packaging material is indicated with an arrow v. This means that the first area 30 is sealed together before second area 40, as seen in FIG. 8. These areas 30, 40 will now be described in detail, as seen from the outside of the packaging material and looking in the direction of the feed direction v. This means that the right edge 11 will be shown to the left in FIG. 8, and the left edge 12 will be shown to the right in FIG. 8.

The first area 30 comprises three parts, a right part 30a which, starting from the right edge 11 of the packaging material, is angled −22.5° in relation to a line which is orthogonal to the feed direction v, a central part 30b which is angled 22.5°, and a left part 30c which is angled −22.5°. The left part 30c ends at the same level as the beginning of the right part 30a, and this is intentional since these parts will be sealed together when the flat material is formed into a tube. The central part 30b corresponds the full length of the final transversal sealing, and the sum of 30a and 30c correspond to the full length of the transversal sealing, and these parts will be brought together by the sealing jaws during operation (30b together with 30a+30c).

The second area 40 also comprises three parts, a right part 40a, starting from the right edge 11, is angled 22.5° in relation to a line which is orthogonal to the feed direction v, a central part 40b which is angled −22.5°, and a left part 40c which is angled 22.5°. The left part 40c ends at the same level as the beginning of the right part 40a, in order for those areas to match each other during forming of the tube. The right part 30a of the first area 30 is shorter than the right part 40a of the second area 40. The central part 30b of the first area 30 has the same length as the central part 40b of the second area 40, and the left part 30c of the first area 30 is longer than the left part 40c of the second area 40.

The right part 40a of the second area 40 hence extends further from the right hand edge 11 of the web 10 of packaging material than the right part 30a of the first area 30. This distance (i.e. the difference in extension of the parts 40a and 30a measured orthogonal to the right edge 11) is indicated as X. The ratio between the distance X and the width of the packaging material (excluding the overlap area) is about 0.21. Correspondingly, the left part 40c of the second area 40 extends less from the right edge 12 of the web than the left part 30c of the first area 30.

Even though the phantom lines that are seen in FIG. 7 are not normally visible on a packaging material for this type of package, it would be easy to verify if the packaging material was adapted for manufacturing this type of package. One sign is the non-printed area where the transversal sealing zone will be (the zig-zag lines). Another sign is if the print on the package is intended to be highlighted according to the final shape of the irregular tetrahedral-shaped package. One design idea, that has been considered, is to have a special fruit or vegetable print on the panels. In order to mimic a real fruit or vegetable, the panels that will form the outer lateral walls of the cube, the panels shaped as isosceles triangles, will then be printed with an image of the outside of a fruit or vegetable, while the panels that will face towards the centre of the cube will have print corresponding to the inside of the same fruit or vegetable. The individual packages will then look like a segment or a piece of the fruit or vegetable. Also other items can be envisioned, where the print shows the outside of the item on the panels shaped as isosceles triangles, and the print on the other panels shows the inside of the item.

Figure 9:
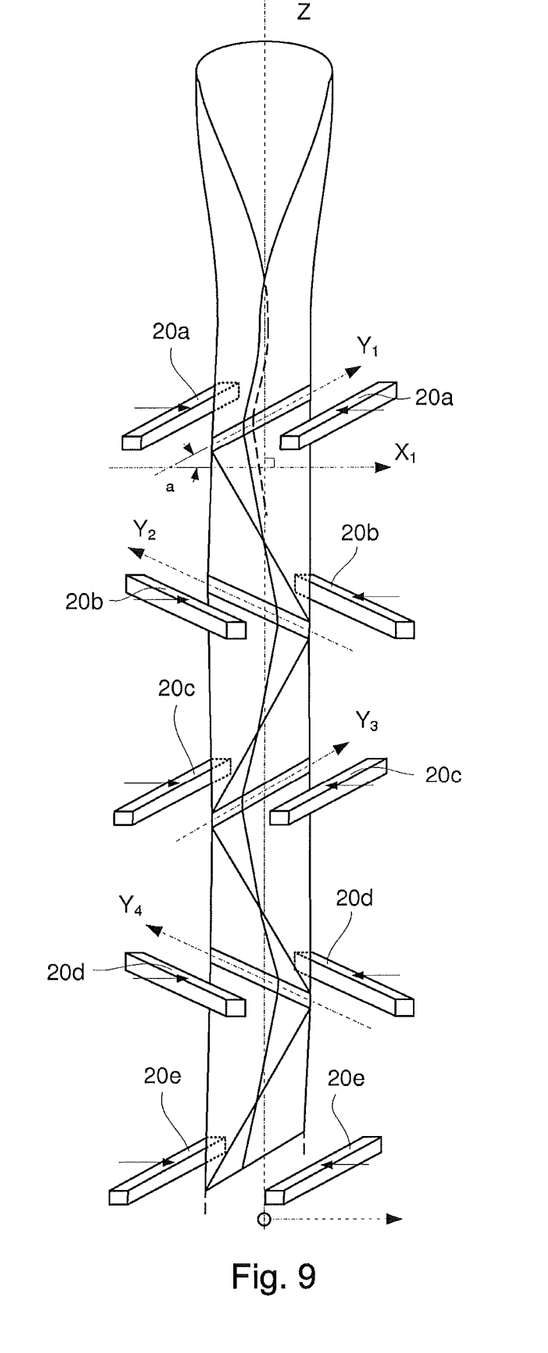
FIGS. 9-10 are perspective views from different directions of a manufacturing process according to the invention.

With reference now to FIG. 9, the pairs of sealing jaws are mounted for reciprocal motion toward and away from one another, as is indicated with arrows on each jaw. The jaws of a pair when moved toward each other act to compress and flatten the tube of packaging material so as to adhere opposed interior surfaces of the packaging material together to achieve a seal of the tubular material along a seam line or sealing axis which intersects the longitudinal axis Z of the tubular material. Adjacent pairs of jaws are so oriented that they meet and make a seal in planes which are perpendicular to one another, i.e. $Y_1$ is perpendicular to $Y_2$, and alternate (every second) jaws of the filling machine operating to achieve seals within the same plane, i.e. $Y_1$ is parallel to $Y_3$. In order to achieve the unique irregularity of the tetrahedral shape of the packages 1a, 1b, each pair of jaws is also so oriented when moving to and away from each other as to lie in a plane which has a predetermined angular relationship to the length of the tube of packaging material so that the longitudinal axis $Y_1$ to $Y_4$ of the transversal sealing achieved by each pair of jaws has the same predetermined angular relationship to the longitudinal axis Z of the tube of packaging material. In comparison to the prior art method, as can be seen in FIG. 11, each sealing jaw is angled 22.5° compared to the traditionally used sealing jaw. This will lead to transversal sealing that will have a longitudinal axis $Y_n$ that is angled 22.5° in relation to a plane that is orthogonal to the longitudinal axis of the tube of packaging material.

The longitudinal spacing of one pair of jaws from another, measured along the longitudinal axis of the tube of packaging material, is uniform. In making the packages 1a, 1b, the spacing between adjacent pairs of jaws is approximately 1.4 times the length of the seam or sealing line made by operation of a pair of jaws, measured between the centres of the sealing jaws. However, this spacing depends on the width of the sealing zone. The angle of inclination between the longitudinal axis of the transversal sealing $Y_n$ and a plane that is orthogonal to the longitudinal axis of the tube of packaging material is approximately 22.5°. During a sealing step, jaws 20a, 20c, 20e perform the same movement along the same plane and with the same angle. Jaws 20b, 20d perform the same movement along the same plane and with the same angle, but the direction of movement towards the tube of packaging material is perpendicular to the reciprocating movement of the jaws 20a, 20c, 20e. This means that the planes of the transversal seals made with jaws 20a, 20c, 20e are perpendicular to the planes of the transversal seals made with jaws 20b, 20d.

In FIG. 9, a longitudinal central axis Z of the tube of packaging material has been arranged, which in normal production is vertical. All the transversal seals, made with the pairs of sealing jaws, intersect said longitudinal axis, and said axis Z also lies in the same plane as the planes of the transversal seals. The transversal seals hence lie in a vertical plane passing through the central axis. The longitudinal axes $Y_n$ of the transversal seals are angled 22.5° in relation to a plane that is orthogonal to the longitudinal direction of the tube. A plane defined by $Y_1$ and Z is perpendicular to a plane defined by $Y_2$ and Z. Looking at the top transversal seal, as made by sealing jaws 20a, the seal is angled 22.5° upward as you follow the seal from the left to the right, or in the direction into the drawing. Looking at the next transversal, as made by sealing jaws 20b, the seal in also angled 22.5° upward as you follow the seal from right to left, or in the direction into the drawing.

With this jaw arrangement, first packages 1a and second packages 1b, being mirrored versions of the first packages, are made alternately, one after the other, in a continuous process.

FIG. 9 is only a schematic representation of a jaw system. This jaw system can either be realised by using two pairs of chain assemblies, on which assemblies many jaws can be mounted. This is the typical setup that is used for the filling machines that manufacture Tetra Classic® packages. The jaw system can also be realised by having only two pairs of jaws which are driven by some drive means, similar to what is used in the Tetra Pak A3/Flex filling machine or TBA/19 filling machine. In such case, the reference numerals 20a, 20c, 20e refer to the same jaw, and reference numeral 20b, 20d refer to the same jaw, but they are shown in the position in which they would have made the transversal seal.

It will of course be understood that each pair of jaws 20a-e in making a transversal seal across the tube of packaging material is making in the same operation the top sealed edge for one of the individual packages 1a, 1b and the bottom sealed edge for another of the individual packages 1b, 1a, the tube of packaging material being subsequently cut along approximately the median line of each transversal seal by any suitable means, not shown, to separate the strip material into individual packages 1a, 1b. In FIG. 9, it may appear that the tube of packaging material is stationary and the jaws make the transversal sealings at different positions. This is not the case in normal production, however, where each sealing jaw makes contact with the tube of packaging material at an almost constant position (position along Z), and the tube is then pulled down allowing for a new sealing jaw to again make a transversal seal at the same position along Z as the previous jaw. This pulling action of the sealing jaws on the tube is what feeds the web of packaging material through the machine. Sometimes, additional feeding rollers are provided further upstream in the filling machine, in order to reduce the tension in the web.

Figure 10:
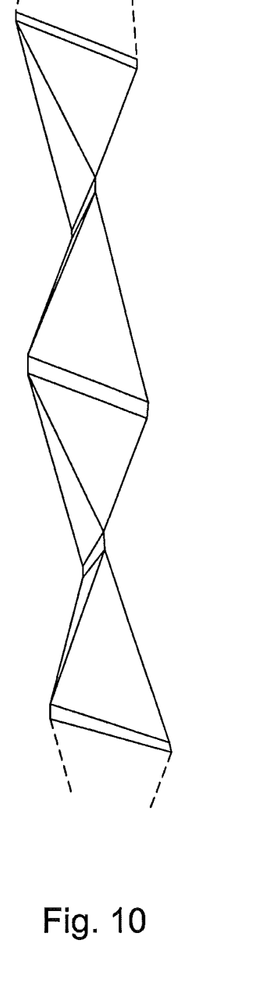

In FIG. 10, the same tube of packaging material as in FIG. 9 is shown from a different direction.

Figure 12:
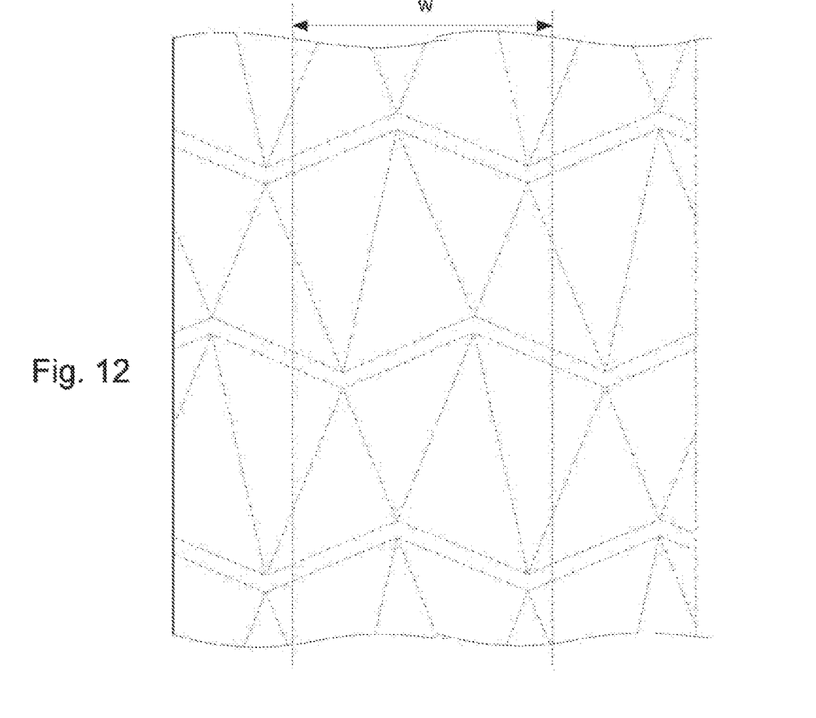
FIG. 12 is a plan view of a double-width web of packaging material.

In FIG. 12, the pattern showing the positions and edges of the finished packages are shown, and here the pattern is repeated twice in the transversal direction. This means that web is now twice as wide as required for making the tube of packaging material. Two straight dashed lines are indicated, and the distance w between them corresponds to the normal width of the packaging material, not including the overlap area. It can be seen that the pattern between the two straight lines fit together, such that the sealing areas 30, 40 will align in the tube form.

If the two lines are moved left or right, without changing the distance w therebetween, this will correspond to twisting the tube inside the jaw system shown in FIG. 9. If the tube is twisted inside the jaw system, this will hence affect where the longitudinal sealing will end up on the final packages, namely along the dashed straight lines. It will be possible to twist the tube, and still make functional packages, but there might be problems at certain areas. If the tube 10 of packaging material is twisted such that the dashed lines pass a transition between a right part 30a, 40a of the first 30 and second area 40 and a central part 30b, 40b, the longitudinal sealing will be located at a corner of a package—this is possible but should be avoided.

A filling machine for carrying out the method as described above is envisioned. This filling machine would comprise similar features to already existing filling machines on the market, such as the Tetra Pak® A1 filling machine for Tetra Classic® aseptic packages. The main difference with this new filling machine, in relation to the Tetra Pak® A1 machine is that the sealing jaws are angled 20-25°, or 22.5°, in relation to a plane that is orthogonal to the longitudinal direction of the tube of packaging material, as it is fed during operation.

The invention claimed is:

1. Method of producing packages from a tube of packaging material for a liquid food product, comprising:
   a) reforming a flat web of packaging material into a cylindrical tube having a longitudinal axis corresponding to a feed direction of the tube,
   b) feeding said tube of packaging material in the feed direction of said tube,
   c) filling said tube with a liquid food product,
   d) transversally sealing said tube, at regular intervals, into separate package volumes, wherein a longitudinal axis of every second transversal seal being parallel to each other, and a longitudinal axis of each adjacent transversal seal being perpendicular to each other,
   e) and wherein a longitudinal axis of each transversal seal is angled in a range between 20-25° in relation to a plane which is orthogonal to the longitudinal axis of the tube of packaging material,
   wherein the flat web of packaging material has a print which correspondingly comprises a first area that will be a part of a first transversal seal comprising a right part being angled −20 to −25° in relation to a transversal direction of the web being orthogonal to the feed direction of the web, a central part being angled 20 to 25° in relation to the transversal direction of the web, and a left part being angled −20 to −25° in relation to the transversal direction of the web, and a second part that will be a part of a second transversal seal comprising a right part being angled 20 to 25° in relation to the transversal direction of the web, a central part being angled −20 to −25° in relation to the transversal direction of the web, and a left part being angled 20 to 25° in relation to the transversal direction of the web.

2. Method according to claim 1, wherein every transversal seal has the same length.

3. Method according to claim 1, wherein the right part of the second area extends a distance further into the web than the right part of the first area, when measured transversally to the right edge of the web, and a ratio between said distance and the width of the web is about 0.20 to 0.22.

4. Method according to claim 1, wherein the print on panels that will form isosceles triangles resembles the outside of a fruit or vegetable, and the print on other panels resembles the inside of the same fruit or vegetable.

5. Combination of flat web of packaging material and filling machine for producing liquid food packages, wherein said filling machine comprises:
   a forming section for reforming the flat web of packaging material into a cylindrical tube having a longitudinal axis corresponding to a feed direction of the tube,
   a pipe for filling said tube with a liquid food product, and
   at least a first and at least a second pair of sealing jaws for transversally sealing said tube, at regular intervals, into separate package volumes, and for feeding said tube of packaging material in the feed direction of said tube,
   wherein the at least first pair of sealing jaws seals every second transversal seal, and the at least second pair of sealing jaws seals each transversal seal not sealed by the at least first pair of sealing jaws, and wherein the pairs of sealing jaws are arranged such that a longitudinal axis of every second transversal seal being parallel to each other, and a longitudinal axis of each adjacent transversal seal being perpendicular to each other, and wherein a longitudinal axis of each transversal seal is angled in a range between 20-25° in relation to a plane which is orthogonal to the longitudinal axis of the tube of packaging material, and wherein the flat web of packaging material has a print which correspondingly comprises a first area that will be a part of a first transversal seal comprising a right part being angled −20 to −25° in relation to a transversal direction of the web being orthogonal to the feed direction of the web, a central part being angled 20 to 25° in relation to the transversal direction of the web, and a left part being angled −20 to −25° in relation to the transversal direction of the web, and a second part that will be a part of a second transversal seal comprising a right part being angled 20 to 25° in relation to the transversal direction of the web, a central part being angled −20 to −25° in relation to the transversal direction of the web, and a left part being angled 20 to 25° in relation to the transversal direction of the web.

6. Combination according to claim 5, wherein every transversal seal has the same length.

7. Combination according to claim 5, wherein the right part of the second area extends a distance further into the web than the right part of the first area, when measured transversally to the right edge of the web, and a ratio between said distance and the width of the web is about 0.20 to 0.22.

8. Combination according to claim 5, wherein the print on panels that will form isosceles triangles resembles the outside of a fruit or vegetable, and the print on other panels resembles the inside of the same fruit or vegetable.

* * * * *